(12) United States Patent  
Kainec

(10) Patent No.: US 7,900,976 B2
(45) Date of Patent: Mar. 8, 2011

(54) COUPLING DEVICE FOR TUBULAR MEMBERS

(75) Inventor: Keith D. Kainec, Sagamore Hills, OH (US)

(73) Assignee: Insight Engineering Services, Inc., Sagamore Hills, OH (US)

( * ) Notice: Subject to any disclaimer, the term of this patent is extended or adjusted under 35 U.S.C. 154(b) by 672 days.

(21) Appl. No.: 11/850,797

(22) Filed: Sep. 6, 2007

(65) Prior Publication Data

US 2009/0066082 A1 Mar. 12, 2009

(51) Int. Cl.
*F16L 19/08* (2006.01)
(52) U.S. Cl. .................. 285/343; 285/348; 285/382.7
(58) Field of Classification Search ............. 285/339, 285/341, 342, 343, 354, 382.7, 348
See application file for complete search history.

(56) References Cited

U.S. PATENT DOCUMENTS

| | | | | |
|---|---|---|---|---|
| 2,100,796 | A * | 11/1937 | Church | 285/340 |
| 2,250,477 | A * | 7/1941 | Fleischman | 277/622 |
| 2,394,351 | A * | 2/1946 | Wurzburger | 285/341 |
| 2,536,745 | A * | 1/1951 | Herold | 285/341 |
| 2,645,099 | A * | 7/1953 | Cumming | 62/511 |
| 2,687,906 | A | 8/1954 | Schnell | |
| 2,693,374 | A * | 11/1954 | Wurzburger | 285/343 |
| 2,693,377 | A * | 11/1954 | Wurzburger | 285/343 |
| 2,701,149 | A * | 2/1955 | Kreidel et al. | 285/148.6 |
| 2,749,152 | A * | 6/1956 | Courtot | 285/342 |
| 3,075,793 | A | 1/1963 | Lennon et al. | |
| 3,112,131 | A * | 11/1963 | Campbell | 285/334.5 |
| 3,201,153 | A * | 8/1965 | Currie | 285/249 |
| 3,375,026 | A | 3/1968 | Szohatzky | |
| 3,379,461 | A * | 4/1968 | Davis | 285/341 |
| 3,393,931 | A * | 7/1968 | Wurzburger | 285/341 |
| 3,584,900 | A | 6/1971 | Lennon et al. | |
| 3,736,008 | A * | 5/1973 | Crawford | 285/342 |
| 3,893,716 | A * | 7/1975 | Moreiras et al. | 285/3 |
| 4,586,731 | A * | 5/1986 | Castrup | 285/4 |
| 4,740,019 | A * | 4/1988 | Casimir et al. | 285/341 |
| 4,826,218 | A | 5/1989 | Zahuranec | |
| 5,069,058 | A | 12/1991 | Hyatt | |
| 5,261,638 | A | 11/1993 | Onishi et al. | |

(Continued)

FOREIGN PATENT DOCUMENTS

KR 2019960004035 U 2/1996

OTHER PUBLICATIONS

International Search Report and Written Opinion of the International Searching Authority; PCT/US2008/075379, filed Sep. 5, 2008.

*Primary Examiner* — James M Hewitt
(74) *Attorney, Agent, or Firm* — Pearne & Gordon LLP

(57) ABSTRACT

A coupling device includes a coupling body and a collar adapted to engage a tubular member in a permanent swaged connection. The coupling device includes axially spaced front and back ferrules which engage during swaging to provide a plurality of seals intermediate the ferrules and the tubular member as well as the coupling body. The back ferrule includes a central region having a generally cylindrical wall that is elastically/plastically deformed to a corrugated tube-like shape during swaging to enhance the maintenance of the seals. A portable installation tool for swaging the coupling body and collar to the tubular member is hydraulically actuated.

17 Claims, 3 Drawing Sheets

U.S. PATENT DOCUMENTS

| | | |
|---|---|---|
| 5,452,921 A | 9/1995 | Hyatt et al. |
| 5,882,050 A | 3/1999 | Williams et al. |
| 6,345,845 B2 * | 2/2002 | Johnston ..................... 285/382.7 |
| 6,517,126 B1 | 2/2003 | Peterson et al. |
| 6,575,501 B1 * | 6/2003 | Loy, Jr. ......................... 285/342 |
| 6,629,708 B2 | 10/2003 | Williams et al. |
| 6,766,582 B2 | 7/2004 | Williams et al. |
| 6,851,729 B2 | 2/2005 | Gibson |
| 6,941,668 B2 | 9/2005 | Williams et al. |
| 7,125,055 B2 | 10/2006 | Dallas |
| 2002/0113438 A1 * | 8/2002 | Lynn et al. .................... 285/354 |

* cited by examiner

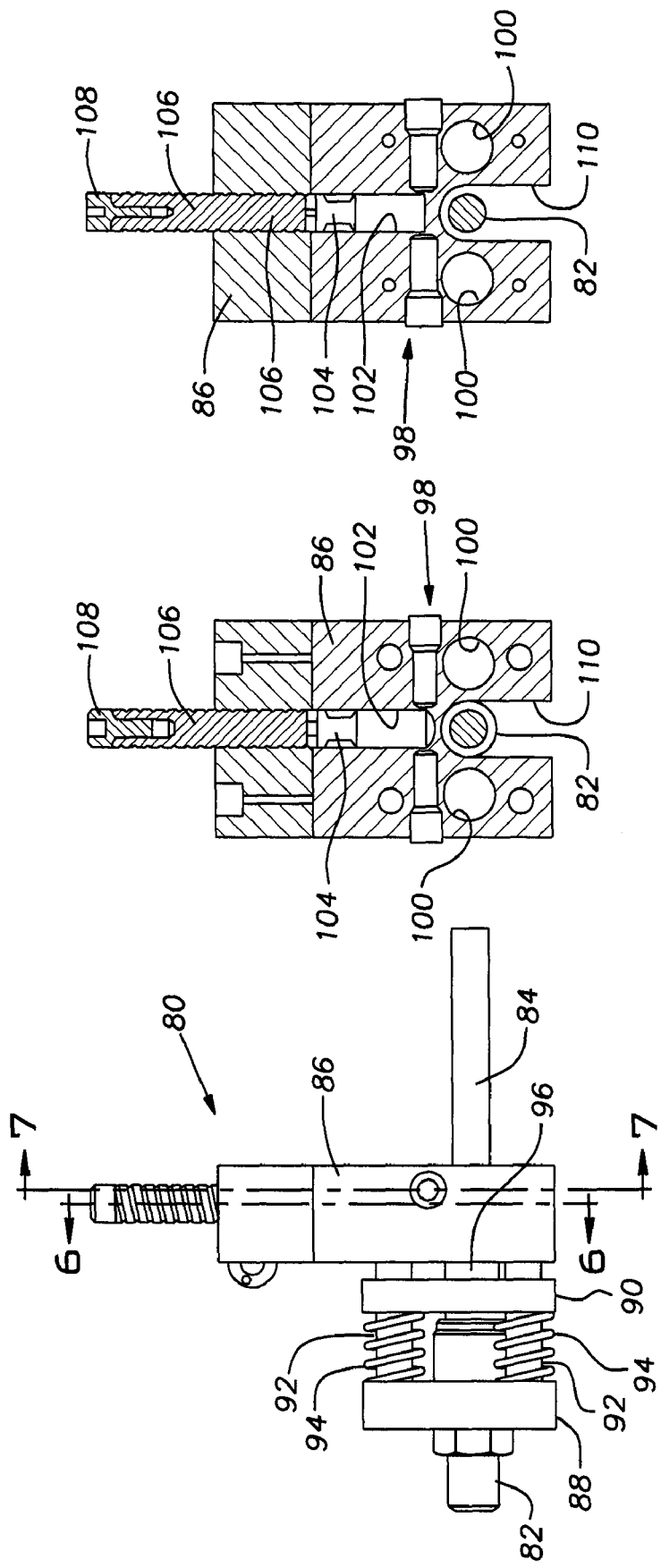

COUPLING DEVICE FOR TUBULAR MEMBERS

BACKGROUND OF THE INVENTION AND RELATED ART

This invention pertains to the art of coupling devices and more particularly to an improved sealing and gripping device and to a tool for the installation of the device.

The invention is particularly applicable to a tube coupling arrangement and will be described with particular reference thereto. However, it will be appreciated that the invention has broader applications and maybe advantageously employed for other uses in a variety of environments.

Fittings are commonly used to connect metal tubes and pipes to each other for use in a variety of applications, such as in the aerospace industry, to convey fuel, hydraulic control fluids, and the like in an aircraft or space vehicle. In these applications, it is critical that there be a secure connection between the coupling body and the tubes in order to withstand vibration and other adverse conditions without failure.

Of particular interest herein are even more severe applications wherein seals for fluids and gases must be maintained under extreme conditions. For example, so-called high pressures applications at pressures in excess of 1000 psi and/or high temperatures. Even under these extreme conditions, it is necessary that acceptable seals be reproducibly formed and maintained. Less severe applications typical applications include automotive air-conditioning systems, oxygen systems in hospitals, instrumentation fittings for natural gas wells, and compressed hydrogen systems used in fuel cells or combustion engines.

The use of swaging to secure fittings to tubular members is known. The fittings and coupling elements may be secured to the tubular member by the direct application of radial forces to deform the tube inwardly and provide a swaged connection. U.S. Pat. No. 5,069,058 discloses a tool for providing such a swaged connection.

Axially swaged fittings including a sleeve surrounded by a deforming ring are also known. For example, U.S. Pat. No. 5,452,921 disclose such an arrangement. Related axially swaged fittings are shown in U.S. Pat. Nos. 6,517,126 and 3,375,026.

There is a need for a hand portable and hand operated installation device that may be easily moved from site to site in a given tubing system. Preferably, the device should be operable by an unskilled worker.

SUMMARY OF THE INVENTION

A coupling device is provided including a coupling body and a collar adapted to engage a tubular member in a permanent connection. The coupling device includes axially spaced front and back ferrules which engage during swaging to provide a plurality of seals intermediate the ferrules and the tubular member as well as the coupling body.

The back ferrule includes a forward region connected by a central region to a rearward region. The shape of the back ferrule is changed by the swaging process. More particularly, a generally cylindrical wall at the central region of the ferrule is elastically/plastically deformed to a corrugated tube-like shape that enhances the maintenance of the seals formed by the ferrules and coupling member with the tubular member.

The increasing load on the coupling device and the progressive collapse of the central region of the back ferrule is believed to slowly seat the components and increase the accuracy of the axial alignment. The continued collapse of the central region of the back ferrule with increasing axial loads thereafter seals the coupling device and the tubular member in their final swaged condition.

The present invention also contemplates a tool for swaging the coupling body and collar to the tubular member. The tool is sized for hand manipulation and swaging operation by a single worker. The tool is arranged to receive the preassembled coupling body and collar on the tubular member. The tool includes a self-contained hydraulic actuation system. The tool is hydraulically actuated by operation of an external control member to axially bias the coupling body and collar together and to form a permanent connection thereof with the tubular member with swaging.

BRIEF DESCRIPTION OF THE DRAWINGS

FIG. 5 is an elevational view, partly in section, of a tool for installing a coupling device to a tubular member in accordance with the invention;

FIG. 6 is a sectional view taken along the line 6-6 in FIG. 5; and

FIG. 7 is a sectional view taken along the line 7-7 in FIG. 6.

DETAILED DESCRIPTION OF THE INVENTION

Figure 1:
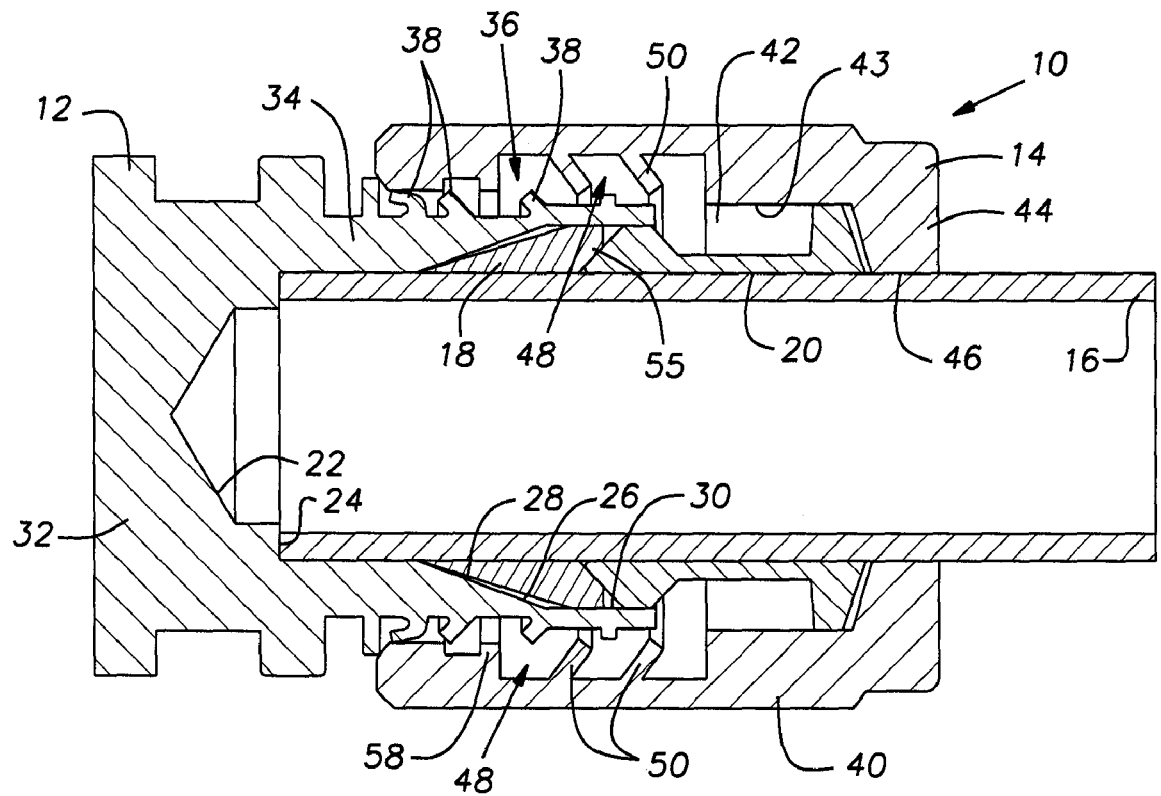
FIG. 1 is a cross-sectional elevational view of a first embodiment of a coupling device preassembled to a tubular member in preparation for swaging in accordance with the invention.
Figure 2:
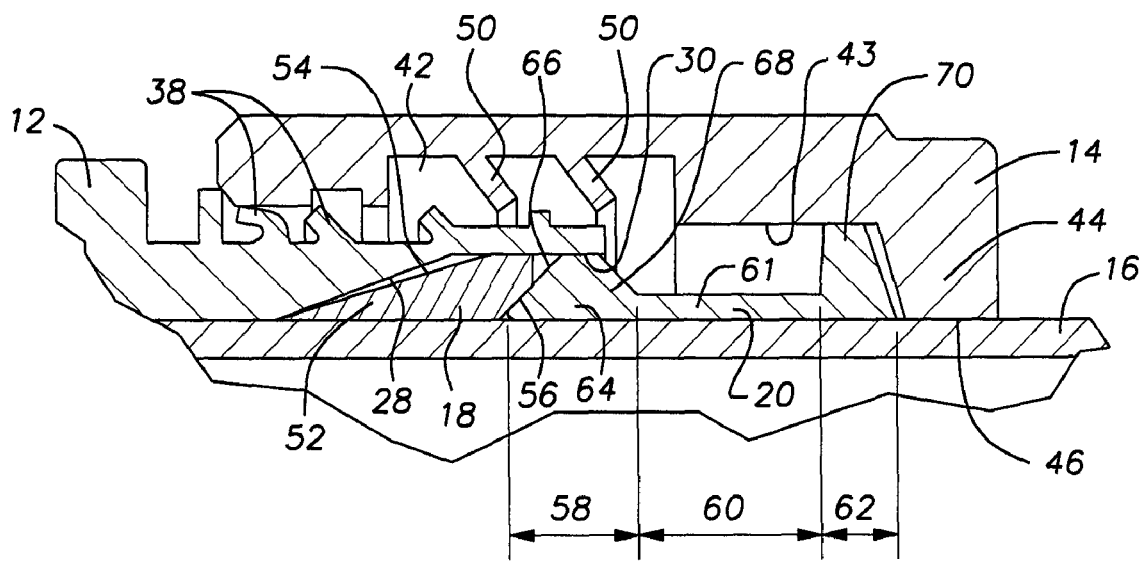
FIG. 2 is a fragmentary elevational view on an enlarged scale of a portion of the coupling device and tubular member shown in FIG. 1.

Referring to FIGS. 1 and 2, a coupling device 10 includes a coupling body 12 and a collar 14. The coupling device is shown preassembled to a tubular member 16 comprising a tube. The coupling device 10 also includes a front ferrule 18 and a back ferrule 20.

The coupling body 12 is a cap, but the coupling body may take any number of forms, such as a male threaded fitting, a female threaded fitting, a union, a tee, a cross or an elbow. Further, the coupling member may be provided directly on a valve, filter, instrument or the like.

The cap 12 includes a blind bore 22 for receiving the end of the tube 16 that is to be closed; however, other coupling bodies may include a through bore or passage for receipt of the tube 16. In all cases, the bore 22 or a through passage has an inner diameter comparable to the outer diameter of the tube 16. Here, the bore 22 has a shoulder 24 against which the end of the tube 16 is seated during preassembly for swaging.

The bore 22 includes a counterbore 26 at the outboard or rearward end of the bore. The counterbore 26 includes a tapered caming or camming mouth providing a frusto-conical caming or camming surface 28. The caming surface 28 extends to a generally cylindrical portion 30 adjacent to the outboard end of the counterbore 26.

The coupling body 12 includes a closed forward end wall 32 and a generally cylindrical body portion 34. Extending along a rearward portion of the periphery of the body portion 34 is an interlocking or engagement section 36 including a plurality of locking rings 38. As explained in more detail below, the engagement section 36 is adapted to interlock with the collar 14 during the swaging operation.

The collar 14 has a generally cylindrical body 40 surrounding an opening 42 at its forward end. The opening 42 extends rearward to a cylindrical portion of reduced diameter 43 and terminates at an annular wall 44 adjacent the rearward end of the collar 14. The wall 44 forms a through passage 46 having an inner diameter comparable to the outer diameter of the tube 16.

An interlocking or engagement section 48 extends along a forward portion of the periphery of the interior surface of the opening 42. The engagement section 48 includes locking rings 50 having an inner diameter sized to interfere with the outer diameter of the locking rings 38. Accordingly, upon axial engagement of the coupling body 12 within the opening 42 in the collar 14, the engagement sections 36 and 38 axially overlap and the locking rings 38 and 50 plastically deform to permanently lock the components together.

The front ferrule 18 and the back ferrule 20, in their original conformations prior to swaging, each have an inner diameter dimensioned to closely, but freely, receive the tube 16 therethrough. The ferrules and components of the coupling device 10 are typically formed of sufficiently hard materials to assure deformation and formation of seals with the tube. The materials used to form the coupling device range from metal to plastic. Typical materials include 316 stainless steel, steel, high temperature nickel alloys such as Inconel®, other corrosion resistant materials such as Monel® and Hastelloy®, and brass.

The ferrule 18 includes a nose portion 52 having a frusto-conically shaped surface 54 adapted for cooperating engagement with the caming surface 28. Rearward of the nose 52, the ferrule 18 includes an enlarged stepped portion 55 having a cylindrical shape and being sized for bearing engagement with the cylindrical portion 30 of the counter bore 26. The ferrule 18 also includes a rearward, tapered internal surface 56 adapted for engagement with the ferrule 20 as described below.

The ferrule 20 has an elongated shape including a forward region 58, a central region 60 and a rearward region 62. The axial length of the central region 60 is about 50% of the total length of the ferrule. In the illustrated embodiment, the ferrule 20 is formed of 316 stainless steel.

The forward region 58 includes a nose 64 having a frusto-conically shaped surface 66 adapted for cooperating engagement with the caming surface 56 of the front ferrule 18. The forward region 58 also includes a first stepped bearing portion 68 having an outer diameter sized to provide bearing support against the inner diameter of the generally cylindrical portion 30 of the counterbore 26.

The central region 60 has a cylindrical shape and may be a right cylinder 61 as illustrated. The wall thickness of the central region should be less than the wall thickness of the adjacent regions. In general, the wall thickness of the central region should be from about 20% to about 50% of the wall thicknesses of each of the forward and rearward regions.

In the illustrated embodiment, the wall thickness of the right cylinder 61 is about 30% of the wall thickness of the forward and rearward regions. Of course, the wall thicknesses may be further varied in accordance with the teachings herein.

The cylindrical configuration of the central region 60 initially resists buckling as seating of the ferrules progresses and then proceeds to buckle with sealing and swaging of the coupling device. Upon swaging, the ferrule deformation of the tube surface or "bite" increases in depth with increasing ferrule wall thickness in the central region 60.

The rearward region 62 includes a second stepped bearing portion 70. The bearing portion 70 has an outer diameter sized for radial bearing support against the inner surface of the reduced diameter cylindrical portion 43 of the opening 42.

The axial overlap achieved upon engagement of the interlocking sections 36 and 48 is limited by contact of the forward axial end of the collar body 40 with an annular shoulder 71 on the coupling body 12. (FIG. 3) The axial overlap assures collapse of the cylinder 61 in the central region 60 to a corrugated shape having a wall profile in axial section corresponding with the letter "W". In accordance with the materials employed and the application seal requirements, the axial length of the cylinder 61 may be reduced upon collapse by 15% to 75%, or more typically, from about 40% to 65%.

In the illustrated embodiment, the axial length of the central region is reduced by about 55% upon collapse. The extent of the collapse of the central region may be varied for different applications, but in all cases, the axial displacement enhances seating and swaging of the ferrules to mount the coupling device 10 to the tube 16 in a permanent fluid tight sealing configuration as explained more fully below.

For purposes of installing the coupling device 10, the coupling body 12, collar 14, front ferrule 18 and back ferrule 20 are preassembled in axial alignment on the tube 16 as shown in FIG. 1. The body 12 and collar 14 are then axially loaded and biased together. In the illustrated embodiment, the forward or closing movement of the coupling body 12 is provided by the advance of the annular wall 44 against the second stepped bearing portion 70.

During initial loading, the frusto-conically shaped surface 66 of the nose 64 of the front ferrule 18 is biased against the tapered internal surface 56 of the front ferrule 18. In turn, the frusto-conically shaped surface 54 of the nose 52 of the front ferrule 18 is biased against the caming mouth or surface 28 of the counter bore 26. In this manner, the front ferrule is seated slowly and accurately followed by the seating of the back ferrule and the progressive collapse of the cylinder 61 in the central region 60.

Figure 3:
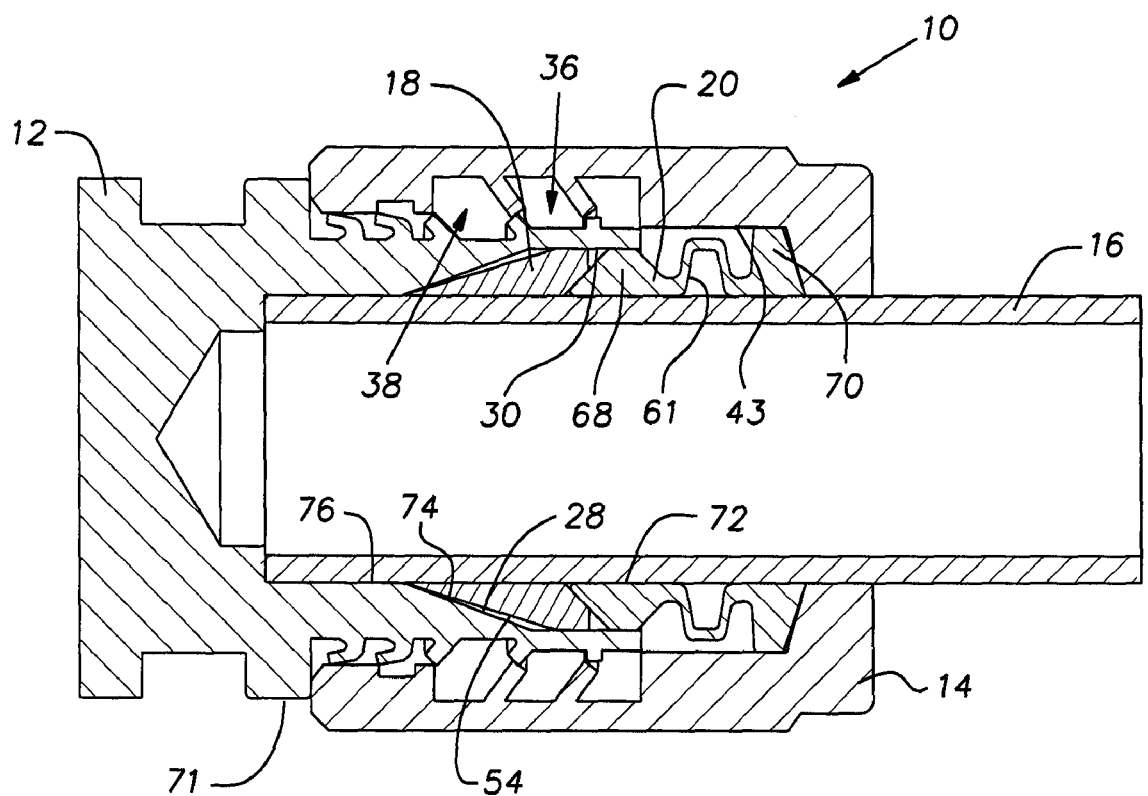
FIG. 3 is a cross-sectional view of the coupling device, similar to FIG. 1, showing the coupling device and the tubular member after the swaging operation has been completed.

Referring to FIG. 3, the coupling device 10 is shown fully swaged to the tube 10. In this condition, the wall of the cylinder 61 has assumed a "W" configuration. This "W" shape is imparted with and retains some elasticity, and acts as a spring, which maintains the back ferrule and the front ferrule bite or seal, and thereby overcomes the spring back of the metal after the removal of the axial or pull-up load. The spring function of the wall of the cylinder 61 may be verified by sectioning the swaged coupling device to permit the partial extension or return of the cylinder wall with release of the confining forces.

During the axial displacement of the swaging process, the first and second stepped bearing portions 68 and 70 are radially restrained by the respectively adjacent bearing surfaces provided by the cylindrical portion 30 and the reduced diameter portion 43 to maintain the concentricity of the components. The effect is to provide twin bearing surfaces on the back ferrule.

In the absence of the twin bearing surface arrangement, it has been found that the back ferrule has a tendency to tip or cock to one side of the tubing. If the back ferrule tips or cocks during the axial displacement or pull-up, a concentric seal is not maintained and a leak path may develop.

The tipping of the back ferrule can be measured by the bite depth at spaced locations around the tube. In absence of twin bearing surfaces, it not unusual to find different bite depths at 180° locations in the order of several thousandths of an inch, e.g., a 0.006" bite depth may be found on one side of the tube and a 0.002" bite depth may be found on the other side of the tube. This is believed to be the direct result of the back ferrule tipping or cocking during pull-up.

Accordingly, the twin bearings maintain the concentricity of the back ferrule and improve the axial alignment of the front and back ferrules with the tube and the adjacent surfaces of the coupling device is maintained. In this manner, a more reliable and reproducible fluid tight seal is established and an enhanced swaged fitting is achieved.

The specific locations of seals formed in the swaged coupling device 10 are indicated in FIG. 3. Particularly, a seal 72 is formed intermediate the forward region 58 of the back ferrule 20 and the outer adjacent surface of the tube 16. A second seal 74 is formed intermediate the surface 54 of the front ferrule 18 and the adjacent surface 28. A third seal 76 is formed intermediate the surface of the bore 22 in the coupling the 12 and the adjacent outer surface of the tube 16.

Figure 4:
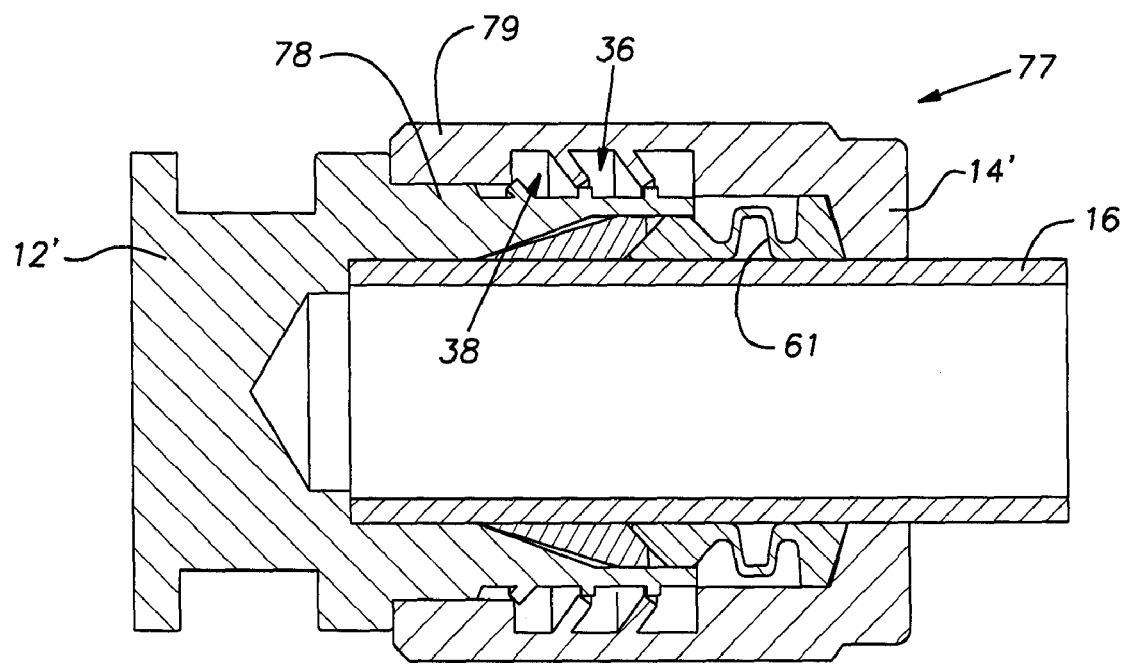
FIG. 4 is an elevational view, on a reduced scale, showing a second embodiment of a coupling device in accordance with the invention after it has been swaged to a tubular member.

Referring to FIG. 4 a second embodiment of a coupling device in accordance with the invention is shown. For convenience, identical elements are marked with the same reference numerals as used in describing the first embodiment and modified elements are similarly numbered with the addition of a prime designation.

As shown in FIG. 4, a coupling device 77 includes a coupling body 12' and a collar 14' swaged to the tube 16. The coupling device 77 includes a front ferrule 18 and a back ferrule 20. The cylindrical wall 61 of the back of ferrule has been collapsed to the corrugated tubular shape, including the "W" wall profile.

The coupling body 12' includes a cylindrical portion 78 extending around the periphery of the body portion 34'. The cylindrical portion 78 receives a peripheral end wall 79 of the cylindrical body 40' of the collar 14'. During the swaging operation, the portion 78 is engaged in a press fit with the peripheral end wall 79. As the interlocking of the engagement section 36 of the coupling body 12' with the engagement section 48 of the collar 14' is being completed, the end wall 79 begins to slip over the portion 78 in a press fit to further enhance and maintain the axial alignment of the components.

Referring to FIGS. 5, 6 and 7, an installation device or tool 80 for swaging a coupling device 82, comprising a male connector and an associated collar, to a tube 84 is shown. The major elements of the tool 80 include a housing 86, a base plate 88 and a push plate 90. The plates 88 and 90 are of generally rectangular shape and are similarly sized.

The base plate 88 is secured to the housing at a fixed distance by four support posts 92 (only two being shown). One of the support posts 92 is fixed adjacent each corner of the base plate and extends through a clearance opening in the adjacent corner of the push plate 90. Each support post 92 extends through a compression spring 94 (only two being shown) located between the base plate 88 and the push plate 90. The compression springs 94 normally bias the plates 88 and 90 apart to allow loading of a coupling device and tubular member.

The push plate 90 is biased towards the base plate 88 by a pair of hydraulically actuated power pistons 96, one being located on each side of the tube 84. To that end, the housing 86 includes a hydraulic reservoir 98 comprising communicating pressure chambers 100 respectively associated with one of the pistons 96. The hydraulic reservoir 98 includes a pressurization and fill duct 102 containing a hydraulic drive piston 104 that is movable to increase and decrease the volume of the reservoir 98.

The drive piston 104 is connected to a pressurization control member comprising a drive screw or ball screw 106 that is threadedly connected to the housing 86. The drive screw 106 may be fitted with a cap screw 108 or other type connector to enable manual or powered rotation of the drive screw 106. For example, the cap screw 108 may operated by a cordless drill, a hex key or an Allen wrench, or a ratchet wrench.

The housing 86, base plate 88 and push plate 90 each has a lower U-shape opening 110 to allow receipt of the preassembled coupling device on the tubular member. As illustrated, the U-shape openings in the base plate 88 and push plate 90 are sized to engage the opposed end faces of the preassembled coupling body 82. Upon pressurization of the hydraulic fluid in the reservoir 98, the pistons 96 are extended and the push plate 90 is advanced toward the base plate 88 to effect swaging of the coupling device 92.

Using a cordless drill for input power, the pressurization necessary to achieve swaging of a coupling device to a 3/8" tube is measured in seconds. The stroke or advancement of the push plate 90 may be determined by pressurization and/or limited by the spacers to provide full inter-engagement of the components of the coupling body 82 as described above with respect to FIGS. 1-4.

The installation tool 80 is of a weight and size that allows its use as a hand tool. That is, the installation tool 80 may be easily moved by hand to each installation site, and the swaging operation may be performed by a single worker. For example, the major dimensions of the housing 86 together with the spaced plates are about 4"×5"×4", and the tool 80 has a weight of about 4.6 pounds.

As compared to other hydraulic tools used by the industry, the installation tool 80 does not require a separate pump and is free of external hydraulic connections. All of the hydraulic components are contained in housing, and pull-up loads or axial closing forces in the order of 6 tons are readily and rapidly achieved with the use of a cordless drill to pressurize the hydraulic fluid. The compact and portable construction of the tool enables its use over extended periods of time as well as in work spaces that are small or otherwise difficult to access.

What is claimed is:

1. A coupling device for use with a tubular member having a generally cylindrical outer wall, said coupling device comprising:

a coupling body having an axial opening including an outer end adapted to receive said tubular member, said opening having a counterbore including an initial generally cylindrical portion adjacent the outer end of the opening that extends to a generally frusto-conical camming surface tapering radially inward, said coupling body having an outer profile including a first mechanical engagement section extending therealong;

a first generally annular ferrule having a tapered external surface portion cooperatively engageable with said coupling body camming surface and a tapered internal surface portion;

a second generally annular ferrule having an axial extent including a forward region including a tapered external surface portion and a first stepped portion, a central region having a tubular portion and a rearward region having a second stepped portion, said tapered external surface of said second ferrule being arranged for cooperative engagement with said tapered internal surface portion of said first ferrule and said first stepped portion being arranged for bearing engagement with said generally cylindrical portion of said counterbore of said coupling body;

a collar having a second mechanical engagement section adapted to selectively engage said first engagement section of said coupling body, said collar having a bore extending axially therethrough for closely receiving said tubular member, and a collar counterbore for receiving said second stepped portion of said second ferrule, said counterbore bore having an internal surface for bearing engagement with said second stepped portion and an end wall for axially biasing said second ferrule toward said first ferrule;

said coupling body, collar and ferrules being sized so that upon swaging engagement said tapered external surface of said second ferrule engages said tapered internal surface of the first ferrule, said tapered external surface of the first ferrule engages said camming surface of said coupling body, said first and second stepped portions of the second ferrule are respectively maintained in bearing engagement with the generally cylindrical portion of the coupling body counterbore and said internal surface of said collar counterbore, and said tubular portion of said second ferrule axially collapses within said central region as said coupling body and collar are permanently fixed together in a fluid tight seal with said tubular member.

2. The coupling device of claim 1, wherein said tubular portion is formed of metal.

3. The coupling device of claim 2, wherein said tubular portion has an axial length that is reduced by from about 15% to about 75% upon collapse.

4. The coupling device of claim 2, wherein said tubular portion is cylindrical and is collapsed to a corrugated shape that acts as a spring to bias the second ferrule and the first ferrule together.

5. The coupling device of claim 2, wherein said first and second engagement sections comprise axially spaced locking rings sized to interlock with a plastic deformation of the rings.

6. The coupling device of claim 2, wherein said tubular portion has an axial length that is reduced by from about 15% to about 75% upon collapse, said tubular portion is a generally right cylinder and is deformed to a corrugated shaped cylinder including a rib extending about said central region when collapsed and said corrugated shaped cylinder has a wall having a "W" shape in axial profile that acts as a spring to enhance maintenance of ferrule bite or seal and thereby overcomes the spring back of the metal after the removal of the swaging load.

7. The coupling device of claim 3, wherein said forward, central and rearward regions of said second ferrule each have a radial thickness and said radial thickness of said central region is from about 20% to 50% of the radial thicknesses of each of said forward and rearward regions.

8. The coupling device of claim 3, wherein said tubular portion is a generally right cylinder and is deformed to a corrugated shaped cylinder including a rib extending about said central region when collapsed and said corrugated shaped cylinder has a wall having a "W" shape in axial profile.

9. The coupling device of claim 8, wherein said corrugated shaped cylinder acts as a spring to bias the second ferrule and the first ferrule together.

10. The coupling device of claim 9, wherein said forward and rearward regions of said second ferrule each have a radial thickness and said cylinder wall has a radial thickness of from about 20% to about 50% of the radial thicknesses of each of said forward and rearward regions.

11. The coupling device of claim 1, wherein said first mechanical engagement section includes a cylindrical portion extending about said coupling body that engages a peripheral end wall of said collar with a press fit as said coupling body and collar are permanently fixed together in a fluid tight seal with said tubular member.

12. A coupling device for use with an elongated tubular member having a generally cylindrical outer wall, said coupling device comprising:

a coupling body having an axial opening including an outer end adapted to receive said tubular member, said opening having a counterbore including a generally frusto-conical camming surface tapering radially inward, said coupling body further including a first mechanical engagement section extending therealong;

a first generally annular ferrule having a tapered external surface portion cooperatively engageable with said coupling body camming surface;

a second generally annular ferrule having a forward region including a forward surface connected by a tubular portion in a central region extending to a rearward region including a rearward surface, said forward surface of said second ferrule being arranged for engagement with said first ferrule;

a collar having a second mechanical engagement section adapted to selectively engage said first mechanical engagement section of said coupling body, said collar having a bore extending axially therethrough for closely receiving said tubular member, and a collar counterbore for receiving said rearward region of said second ferrule;

said coupling body, collar and ferrules being arranged for axial closing engagement to bias said forward surface of said second ferrule into engagement with said first ferrule and to collapse the tubular portion of said second ferrule within said central region as said coupling body and collar are permanently fixed together in a fluid tight seal with said tubular member, wherein said tubular portion is formed of metal, is generally cylindrical and is deformed to a corrugated shaped cylinder that acts as a spring to enhance maintenance of ferrule bite or seal and thereby overcomes the spring back of the metal after the removal of the axial swaging load.

13. The coupling body of claim 12, wherein said tubular portion has an axial length that is reduced by about 30% due to its collapse.

14. The coupling body of claim 13, wherein said corrugated shaped cylinder has a wall having a "W" shape in axial profile.

15. The coupling device of claim 12, wherein said tubular portion has an axial length that is reduced by from about 15% to about 75% upon collapse, said tubular portion includes a rib extending about said central region when collapsed and said corrugated shaped cylinder has a wall having a "W" shape in axial profile.

16. The coupling of claim 12, wherein said counterbore in said coupling body includes an initial generally cylindrical portion extending to said generally frusto-conical camming surface, said first generally annular ferrule also has a tapered internal surface portion, said second generally annular ferrule forward surface has a tapered external surface portion extending to a first stepped portion, and said rearward surface has a second stepped portion, said tapered external surface forward surface of said second ferrule being arranged for cooperative engagement with the tapered internal surface portion of said first ferrule, and said first and second mechanical engagement sections being arranged for axial closing engagement to bias said tapered external surface forward surface of said second ferrule into engagement with said tapered internal surface of the first ferrule and the first stepped portion of the second ferrule into engagement with the generally cylindrical portion of the first coupling body counterbore, and to collapse the tubular portion of said second ferrule within said central region as said coupling body and collar are permanently fixed together in a fluid tight seal with said tubular member.

17. The coupling device of claim 12, wherein said first and second mechanical engagement section includes a cylindrical portion extending about said coupling body that engages a peripheral end wall of said collar with a press fit as said coupling body and collar are permanently fixed together in a fluid tight seal with said tubular member.

* * * * *

UNITED STATES PATENT AND TRADEMARK OFFICE
CERTIFICATE OF CORRECTION

| | |
|---|---|
| PATENT NO. | : 7,900,976 B2 |
| APPLICATION NO. | : 11/850797 |
| DATED | : March 8, 2011 |
| INVENTOR(S) | : Keith D. Kainec |

It is certified that error appears in the above-identified patent and that said Letters Patent is hereby corrected as shown below:

Column 7, line 3 (Claim 1, line 33), "counterbore bore having" should read --counterbore having--;

Column 8, line 36 (Claim 12, last line), delete "axial";

Column 9, lines 6 and 7 (Claim 17, lines 1 and 2), delete "and second".

Signed and Sealed this
Eighteenth Day of October, 2011

David J. Kappos
*Director of the United States Patent and Trademark Office*